(No Model.) 2 Sheets—Sheet 1.

J. KIRBY.
CULTIVATOR.

No. 469,807. Patented Mar. 1, 1892.

Witnesses
Frank Popham
Geo. W. Wilson

Inventor
John Kirby
Per R. W. Pugh,
Attorney (No Model.) 2 Sheets—Sheet 2.
J. KIRBY.
CULTIVATOR.
No. 469,807. Patented Mar. 1, 1892.
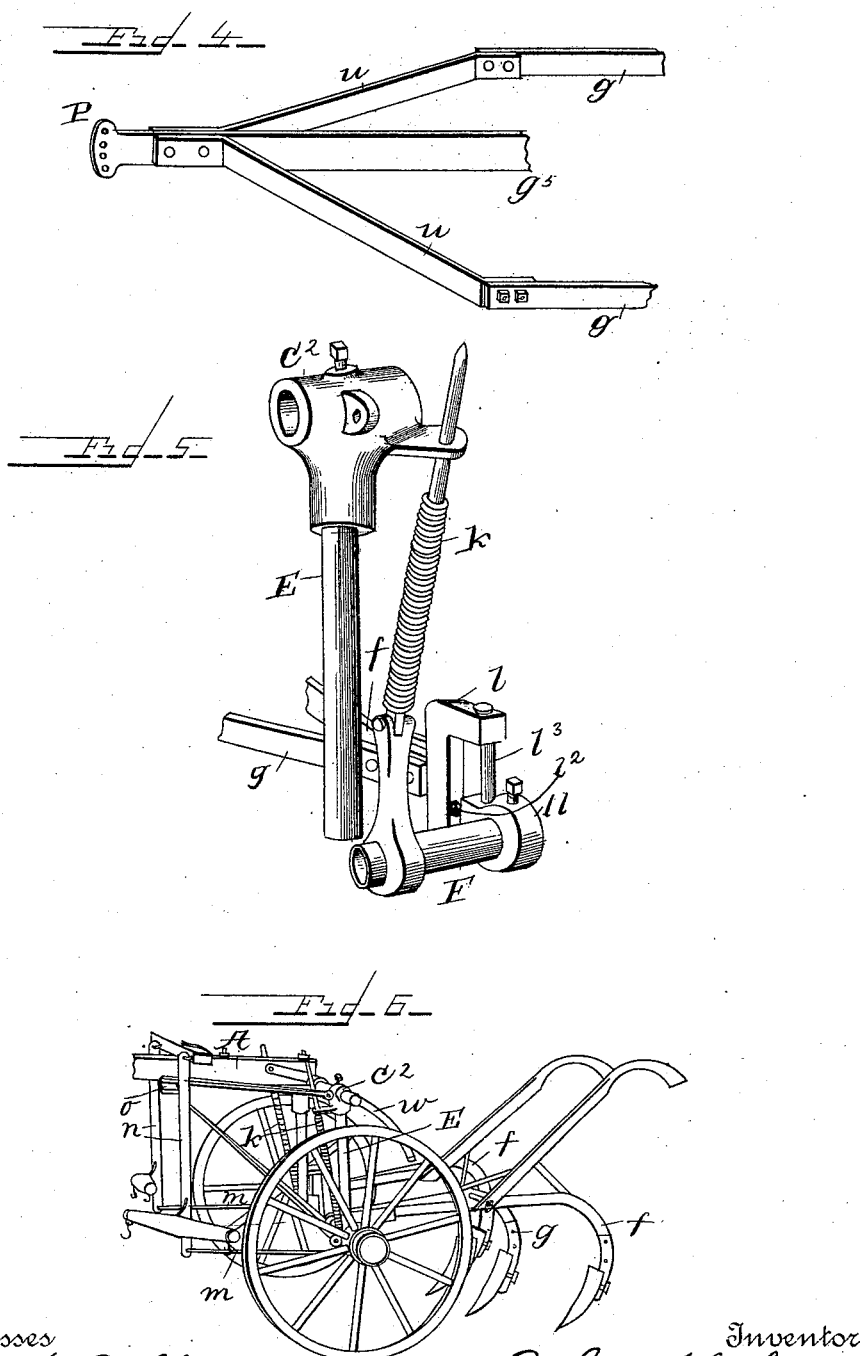
Witnesses
Frank Popham
Geo W Wilson
Inventor
John Kirby
Per: R. W. Pugh,
Attorney

UNITED STATES PATENT OFFICE.

JOHN KIRBY, OF MARENGO, IOWA.

CULTIVATOR.

SPECIFICATION forming part of Letters Patent No. 469,807, dated March 1, 1892.

Application filed June 26, 1891. Serial No. 397,656. (No model.)

*To all whom it may concern:*

Be it known that I, JOHN KIRBY, a citizen of the United States, residing at Marengo, in the county of Iowa and State of Iowa, have invented a new and useful Improvement in Cultivators, of which the following is a specification.

My invention relates to improvements in cultivators in which changeable parts are shifted, added, or removed to form a stirring-cultivator for fall plowing, seeder-cultivator, or a corn-plow; and the objects of my invention are, first, to combine the several implements on one frame and set of wheels; second, to form a gang of shovels that would stir all of the ground cultivated; third, to form a gang of shovels that would not choke in trashy ground or stalk ground; fourth, to make a coupling on a corn-plow readily adjustable to any depth of plowing. I attain these objects in the mechanism illustrated in the accompanying drawings, in which—

Figure 1:
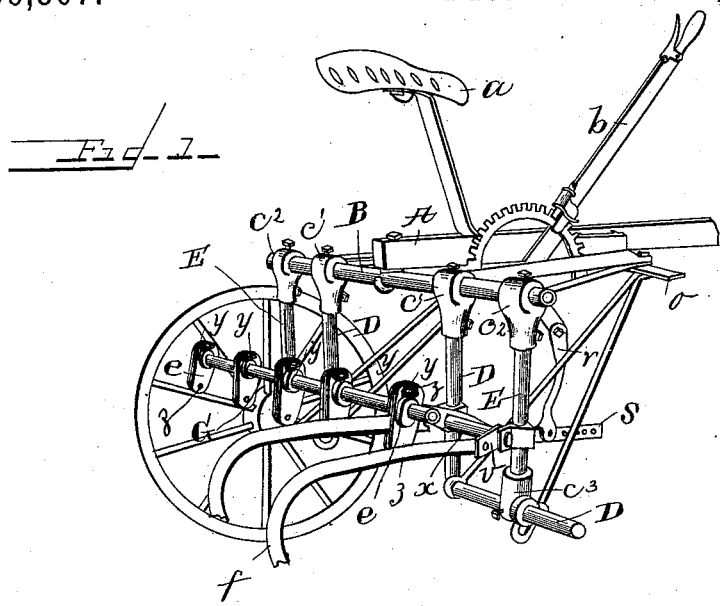
Figure 2:
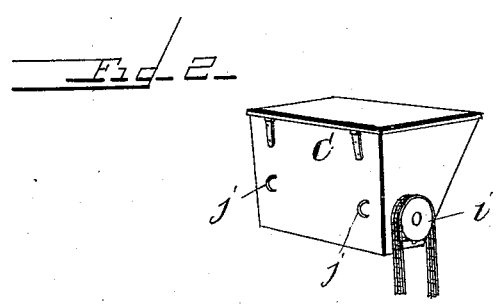
Figure 3:
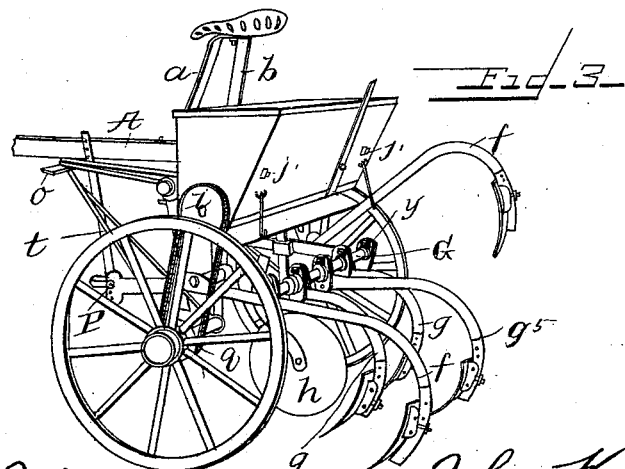

Figure 1 is a rear perspective view of the frame of the machine used for cultivator and seeder attachments. Fig. 2 shows the seeder attachment. Fig. 3 is a perspective view of the seeder with cultivator. Fig. 4 is the cultivator-beams. Fig. 5 is a corn-plow attachment, and Fig. 6 the corn-plow complete.

Similar letters refer to similar parts throughout the several views.

The tongue A, attached to hollow cross-rod B, which is attached by cross-heads $c'$ and $c'$ with set-screws to solid rods in shape of right angles D and D and braced by vertical hollow rods E and E, each attached by cross-heads $c^2$ and $c^3$ and, having wheels on axle ends of rod D, forms the permanent frame of the machine. The lever $b$, turning crank $r$, which works lever $s$ with a fulcrum on the horizontal bolt $x$ attached by cross-heads to vertical rods D and E, is pushed forward to raise and backward to lower the solid horizontal rod G, which raises or lowers the gangs of shovels held by clamps $e$. On the left side of machine rod G is similarly attached to like horizontal bolt $x$, which is attached to rods D and E on that side. The clamps $e$ hold shovel-beams $f$ and $g$ firmly by means of bolts $z\ z$, and a collar with a set-screw $y$ on each side of clamp is used to fasten clamps on rod G, and by means of these collars and set-screws clamps can be shifted right or left on this rod. (See Fig. 1.)

The seeder-box C in Fig. 2 is attached by cross-hooks $j\ j$ to cross-rod B, as in Fig. 3, and a chain $q$ over cog-wheel $i$ is run by cog-wheel on inside of left carriage-wheel and runs the seeder. Any seeder running by such a motion may be attached, as above set forth.

In Fig. 3 when all shovels are down the center shovel on beam $g^5$ is set on a line crosswise between outside shovels on beams $f$ and $f$, or slightly back of such line, to prevent shovels choking in stalk ground, where center shovel plows up the corn-stubs, which are cut in two by rolling cutter $h$ just ahead of it. The shovels on two outside beams $f$ and $g$ on each side are set as in an ordinary corn-plow; the inside one in front of the other.

The top part of center beam $g^5$ is straight and flat with edge up and is much wider than the other beams for the reception of a rolling cutter fastened by a clevis or clamp, and at its end $p$ has a clevis to fasten whiffletrees to for draft of cultivator. The top part of clevis $p$ is attached to adjusting-bar $t$ with row of holes at top, and bar $t$ is attached to the tongue A by a bolt, as in Fig. 3. On each side of this center beam, near to clevis $p$, a flat bar $u$ is riveted, meeting beam $g^5$ at an acute angle, and is of the same size as shovel-beams $g$. (See Fig. 4.) Shovel-beams $g$ are attached to back ends of bar $u$ by bolts, as shown in this figure.

The front ends of shovel-beams $f$ on either side of machine are bolted to small plate $v$, which has a hole through it for the reception of rod $x$, on which rod it freely turns as the shovel-beams are raised or lowered, as in Fig. 1. The five shovel-beams are adjusted in clamps $e$ and firmly fastened at proper distances apart upon rod G by means of bolts $z$ and set-screws $y$. The outside shovel-beams $f\ f$ are raised or lowered by raising or lowering horizontal bolts $x$ and $x$, fastened between rods D and E on either side by cross-heads with set-screws. By means of vertical bar $t$ in Fig. 3, fastened to clevis $p$ at the bottom and to tongue at top with bolt and row of holes in bar, the three center beams $g\ g$ and $g^5$ are raised or lowered. All of the shovel-beams are raised or lowered together by lever $b$.

When seeding in cornstalk ground, shovel-beams $f$ on each side, if not needed, may be loosened from clamp $e$ and hooked up to seeder-box, as shown in Fig. 3. The cross-bar $o$ under the tongue is connected with brace-rods running to rods B and D and their cross-heads. The tongue A may be shifted from side to side on cross-bar $o$ and rod B, according to the number of horses used for draft. The seeder-box C and chain $q$ are taken off when machine is used for cultivating only.

The seat $a$, lever $b$ and its attachments $r$ $s$ $x$ and its cross-heads, and rod G and its attachments and other parts of the machine not needed are removed for corn-plow. The cross-heads $c'$ and $c^2$ are shifted nearer the tongue when frame is used for corn-plow. The shovel-beams $f$ and $g$ on each side are unbolted. Shovel-beam $f$ on left side and shovel-beam $g$ on right side form left-hand gang, and shovel-beam $f$ on right side and shovel-beam $g$ on left side form right-hand gang for corn-plow, and are attached, as shown in Fig. 5, to coupling $l$ by means of bolts. The coupling $l$ can be shifted up or down to regulate depth of plowing by means of a set-screw in cross-head $l$ $l$ at $l^2$. Coupling $l$ is fastened to cylinder F by bolt $l^3$ in cross-head $l$ $l$. Cylinder F goes on horizontal part of rod D, on which it turns to raise or lower shovels, which may be raised to hook $w$, Fig. 6. Spring $h$, working on rod in arm on cross-head $c^2$, is used to force shovels in or out of the ground as needed to regulate depth of plowing. By turning cylinder F in cross-head $l$ $l$ the spring $h$ may be set backward to force shovels in ground or set forward to force shovels out of the ground. A rod $m$, Fig. 6, is attached to eye in lower cross-head $c^3$, Fig. 1, and is attached to draw-bar $n$ for singletrees, Fig. 6. Draw-bar $n$ is attached above to front of doubletree working on tongue.

Having described my invention, what I claim, and desire to secure by Letters Patent, is—

1. In a wheel-cultivator, the combination, with the tongue A and cross-bar B, of the cross-heads $c'$ $c^2$, adjustable thereon, the right-angled bars D, forming the arched axle, the rods or standards E, adjustably coupled to the axle and cross-bar, the bar $o$, and braces connecting it with the axle, substantially as described.

2. The combination, with the frame, of the gang of shovel-beams $g$ $g^5$, the cross rod or bar G, the clamps $e$, and the independent shovel-beams $f$, the rod G and its attachments $s$, $r$, $x$, and $b$, adapted to be removed, and the shovel-beams $f$ and $g$, adapted to be shifted to convert the machine into a straddle-row cultivator, substantially as described.

3. In combination with the frame, the cross-bar G and the clamps $e$, the elongated center beam $g^5$, with its cutter and draft-clevis $p$ and adjusting-bar $t$, the short beam $g$, connecting-bars $u$, the outer beams $f$, plates $v$, and rod $x$, substantially as shown and described.

4. The combination, with the frame and the shovel-gangs and the rod G clamped thereto, of the interchangeable outer beams $f$, supported in front by plate $v$ on rods $x$, adjustably attached to vertical standards in the frame, and of the bars $s$ $r$ and lifting-lever $b$, substantially as shown and described.

JOHN KIRBY.

Witnesses:
J. M. McCune,
M. H. Pugh.